United States Patent
Sharifi Mehr

(10) Patent No.: US 11,218,419 B1
(45) Date of Patent: Jan. 4, 2022

(54) EXECUTION REQUEST PRIORITIZATION BY CONTEXT

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 15/371,108

(22) Filed: Dec. 6, 2016

(51) Int. Cl.
*G06F 15/173* (2006.01)
*H04L 12/911* (2013.01)
*H04L 12/863* (2013.01)

(52) U.S. Cl.
CPC .............. *H04L 47/70* (2013.01); *H04L 47/50* (2013.01)

(58) Field of Classification Search
CPC ............. G06F 2009/4557; H04L 47/70; H04L 43/0876; H04L 47/808; H04L 67/10; H04L 47/803; H04L 47/50
See application file for complete search history.

(56) References Cited

U.S. PATENT DOCUMENTS

| | | | | |
|---|---|---|---|---|
| 6,665,867 B1 * | 12/2003 | Ims | | H04L 67/34 717/173 |
| 7,463,935 B1 * | 12/2008 | Miller et al. | | G06F 17/00 700/90 |
| 2008/0104589 A1 * | 5/2008 | McCrory et al. | | G06F 12/06 718/1 |
| 2009/0125902 A1 * | 5/2009 | Ghosh et al. | | G06F 9/455 718/1 |
| 2012/0331463 A1 * | 12/2012 | Orveillon | | G06F 8/63 718/1 |
| 2013/0205092 A1 * | 8/2013 | Roy et al. | | G06F 12/084 711/130 |
| 2015/0229645 A1 * | 8/2015 | Keith et al. | | H04L 63/10 |
| 2016/0119244 A1 * | 4/2016 | Wang et al. | | H04L 47/50 |
| 2017/0031955 A1 * | 2/2017 | Kenchammana-Hosekote | | H04L 67/142 |
| 2018/0143852 A1 * | 5/2018 | Ballantyne | | G06F 9/5027 |

* cited by examiner

*Primary Examiner* — Suraj M Joshi
*Assistant Examiner* — Ayele F Woldemariam
(74) *Attorney, Agent, or Firm* — Knobbe, Martens, Olson & Bear, LLP

(57) ABSTRACT

Systems for processing requests to execute a program code of a user use a message queue service to store requests when there are not enough resources to process the requests. The message queue service distributes the stored requests across multiple queues; each queue is associated with a context of the underlying events that generate the requests. A context describes one or more attributes of the event, such as information identifying the requestor or the event source. Thus, queued messages are divided into different queues based on user ID, event source or location, event type, etc. The message queue service then selects from the queues when requested to deliver a queued request. This provides a balanced delivery of requests from different requestors or groups of requestors.

19 Claims, 9 Drawing Sheets

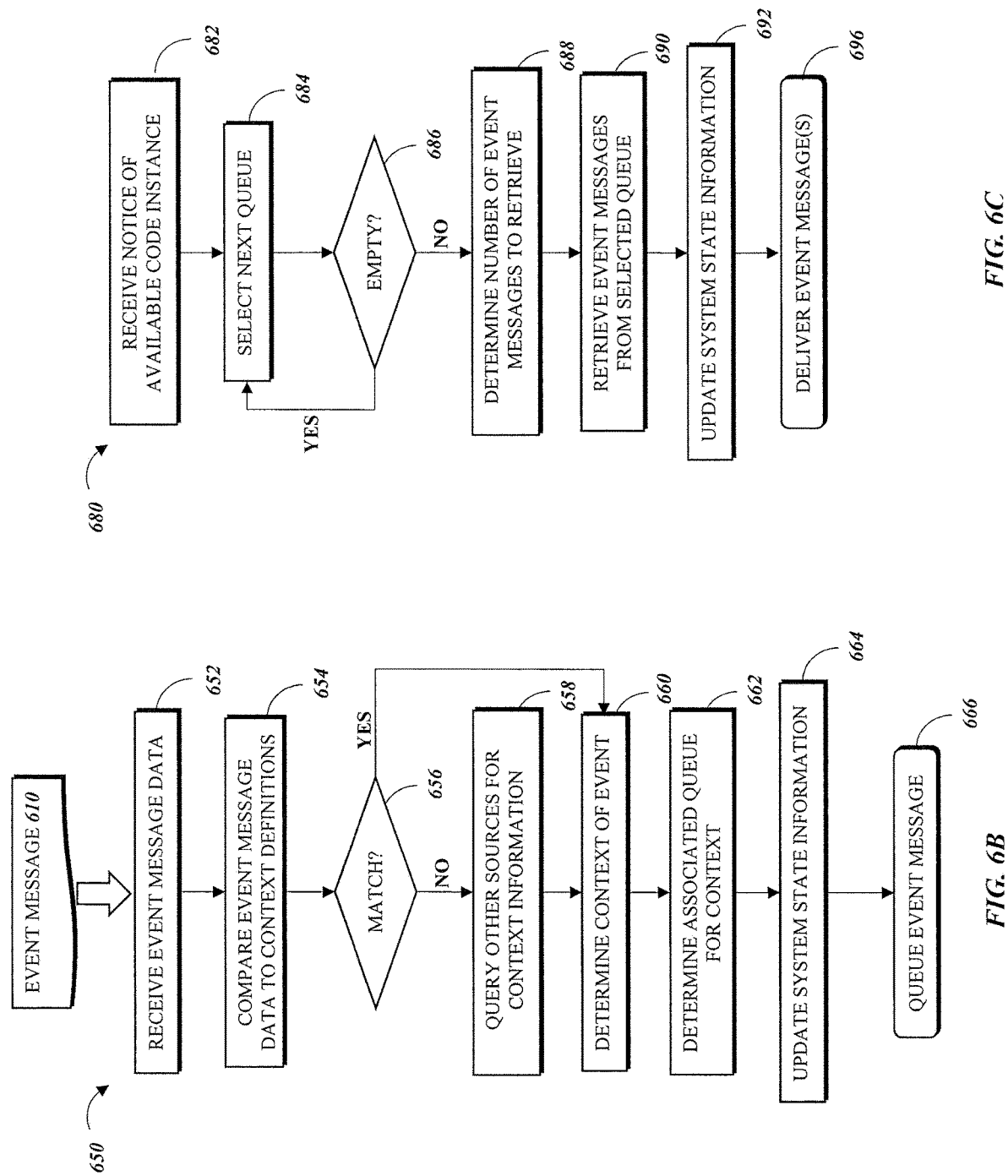

EXECUTION REQUEST PRIORITIZATION BY CONTEXT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device can create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, called "containers." The virtual machine controls allocation of resources such as processing power and memory, and each container has its own process and network space in which the container can, for example, execute software programs.

In turn, users can request computer resources from a data center, including single computing devices or a configuration of networked computing devices, and be provided with varying numbers of virtual machine resources. In a computing environment, a user's access to resources can be limited based presently available resources, a service level, a maximum bandwidth, etc. For example, a user may be limited to a certain number of concurrently-instantiated virtual machines. If a request to allocate more resources arrive while the maximum resources are allocated, the request may be rejected, and an error message returned to the requestor. Or, the request may be placed in a queue and then processed (e.g., after earlier queued requests) when resources come available.

BRIEF DESCRIPTION OF THE DRAWINGS

The detailed description is set forth with reference to the accompanying figures. The use of the same reference numbers in different figures indicates similar or identical items or features.

FIG. 6B is a flow diagram of an exemplary method for queueing event messages, in accordance with the present disclosure;

FIG. 6C is a flow diagram of an exemplary method for delivering queued event messages, in accordance with the present disclosure;

DETAILED DESCRIPTION

Figure 1:
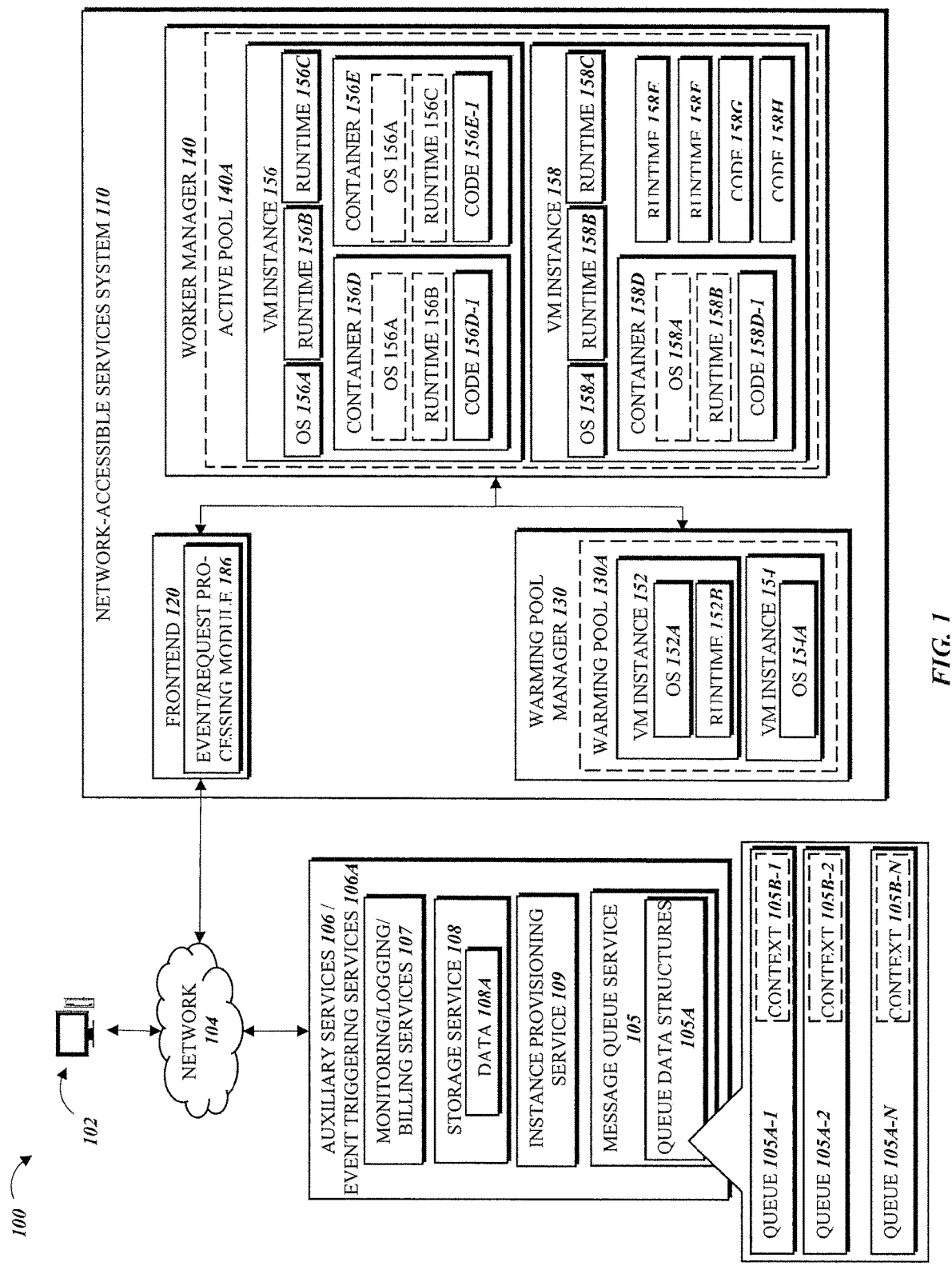
FIG. 1 is a diagram illustrating an exemplary system for queueing event messages across multiple queues, in accordance with the present disclosure.

Developers that use computing environments, such as a virtual private cloud, to perform computing operations (e.g., execute code, including threads, programs, software, routines, subroutines, processes, etc.) are faced with difficulties in selecting and customizing the proper type, size, number, and duration of compute resources in accordance with their needs. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Additionally, the developer may be faced with demands for fair or prioritized resource allocation, such as when a single user submits bulk or high-frequency requests in excess of the developer's limits, inhibiting the processing of other users' requests. Thus, an improved method of allowing users to take advantage of the virtual machine instances provided by service providers is desired.

A system can maintain a pool of pre-initialized virtual machine instances that are ready for use as soon as a user request is received, as described in the present disclosure. Specifically, a network-accessible services system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In certain embodiments, elements of the system facilitate transportation or communication of event messages generated in a first programmatic environment (e.g., at an auxiliary service) to the programmatic environment provided by the network-accessible services system described herein. To further facilitate propagation and transportation of a triggered event from the first programmatic environment to the network-accessible services system, event messages may be generated to include information descriptive of the triggered event, a user associated with a request to execute user code in response to the triggered event, and programmatic information to enable the network-accessible services system to convert the event message into a user request for further processing by the network-accessible services system. The event message and/or programmatic information contained therein may be structured according to a schema, a code model, or an application programming interface ("API") to facilitate both creation/generation of the event message at the auxiliary service and conversion/processing of the event message at the network-accessible services system.

In this manner, the system performs an automatic rate matching and scaling between events being triggered on an auxiliary service and the corresponding execution of user code on various virtual machine instances. Thus, the network-accessible services system is capable of responding to events on-demand, whether the events are triggered infrequently (e.g., once per day) or on a larger scale (e.g., hundreds or thousands per second). However, various considerations may create a need to impose limitations on the immediate availability of virtual machine instances. For example, the physical computing devices that implement the network-accessible services system may reach capacity, having allocated all available resources. In another example, the network-accessible services system's users may have service agreements that limit access to resources. The network-accessible services system may implement a resource allocation limit, such as a limit on concurrently instantiated virtual machines by the user, or on concurrent executions of the user's program code. Since they are processed asynchronously, requests for the program code (i.e., event messages) that arrive when the network-accessible services system is operating at the concurrent execution limit (of, e.g., 50 concurrent executions) cannot be rejected. The network-accessible services system or an auxiliary service, such as a message queue service, may place these messages in a queue to await processing.

Some implementations of the system may use a single logical first-in-first-out message queue, where messages are ordered and then processed according to their arrival times. This can create substantial imbalances with respect to processing wait time for different users. For example, the action of a user uploading a file to a data store may generate an event that triggers a program code which, when executed, performs an anti-virus scan of the uploaded file and sends a result of the scan to the user. If multiple user are uploading files to the data store for scanning by the associated program code, a user uploading a high volume of files could unfairly consume most or all of the program code's concurrent execution limit. Hence, users with lower volume of files will get less chance for execution of their scans, and they will receive their scan results likely at a slower rate.

The present disclosure provides further aspects of the system, in which elements manage the queueing and delivery of requests for program code execution that arrive when there are no program code instances available to allocate to the requests (i.e., the network-accessible services system is already operating the maximum number of program code and/or virtual machine instances allowed). A message queue framework for prioritizing event message (i.e., associated with each request) handling provides a plurality of queues, and a message queue service may distribute event messages awaiting processing across the queues according to a set of handling rules. When a program code instance becomes available to process a request, the message queue service may select the next event message in one of the queues, again according to the handling rules, and deliver the selected event message for processing. The multiple queues and the handling rules change how the queued event messages are delivered for processing from a strictly chronological sequence (e.g., of a single message queue) to a more balanced distribution that accommodates prioritization of requests according to their contexts, as described further below.

The handling rules coordinate the arrangement of message queues, the queueing of messages into the queues, and the selection of messages from the queues for delivery, according to activity levels in the system, and according to one or more contexts of the events embodied in the event messages. The handling rules may include thresholds for system usage parameters such as volume of event messages, number of queued messages, real-time processing metrics, available resources, and the concurrent execution limit. Exceeding these thresholds may cause the system to increase or decrease the number of available queues, for example.

Each queue may be associated with one or more contexts, and events having the corresponding context may be placed in the queue, according to the handling rules. A context is a property, characteristic, or attribute of the event, of the event source, or of the requesting user, which may be identified from information available to the system. A context may be a unique identifier, such as a user ID, event ID, Uniform Resource Locator (URL) or other internet address, and the like. A context may also be a class, category, group, or type identifier, such as a type of event, a country or other geographical location, or a group of users who are all employees of the same company. A context may also be a hierarchy, group, or other combination of attributes. In various embodiments, a context may be any attribute that can be identified by the system and that facilitates placing an event message having the attribute into a queue for event messages having the attribute.

Thus, queued messages can be balanced according to the context of their events. In a simplified example described in more detail below, for a program code that has one very high-volume requestor and many low-volume requestors, the message queue framework may be arranged to include two queues. One queue is associated with the user ID or another unique identifier of the high-volume requestor; the other queue, in the simplest case, may have no context associated with it. In operation, the message queue service places all of the high-volume requestor's event messages into the associated queue, and all other event messages into the other queue. The message queue service may then alternate between the queues to select an event message for delivery. In another example, each requestor may have its own queue associated with the requestor's user ID; all event messages may be queued by user, and then a random, round-robin, or other methodology may be used to select the event messages for delivery. The message queue framework may also accommodate prioritization of messages, such as by generating more queues for some contexts than for others; contexts with more queues will be more frequently selected by random and round-robin delivery. Relatedly, the handling rules may specify that certain contexts or certain queues can have a larger number of event messages dispensed when the queue is selected.

Referring to FIG. 1, embodiments of the present disclosure may operate within or upon a computing environment 100 in which users (e.g., developers, website visitors, etc.) of user computing devices 102 may run various program codes using the virtual computing resources provided by a network-accessible services system 110 allocated within the computing environment 100. The computing environment 100 may be one of any suitable type and/or configuration of a compute resource virtualization platform implemented on one or more physical computing devices. Non-limiting examples of a computing environment 100 include data centers, clusters of data centers organized into zones or regions, a public or private cloud environment, and the like.

In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The network-accessible services system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the network-accessible services system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the network-accessible services system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network-accessible services system 110 is depicted in FIG. 1 as operating in a distributed computing environment including several computer systems that are interconnected using one or more computer networks. The network-accessible services system 110 could also operate within a computing environment having a fewer or greater number of devices than are illustrated in FIG. 1. Thus, the depiction of the network-accessible services system 110 in FIG. 1 should be taken as illustrative and not limiting to the present disclosure. For example, the network-accessible services system 110 or various constituents thereof could implement various Web services components, hosted or "cloud" computing environments, and/or peer-to-peer network configurations to implement at least a portion of the processes described herein.

Further, the network-accessible services system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the computing environment 100 includes a network-accessible services system 110, which includes a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the network-accessible services system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the network-accessible services system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the network-accessible services system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the network-accessible services system 110 may comprise any number of warming pools and active pools.

In the example of FIG. 1, the network-accessible services system 110 is illustrated as being connected to the network 104. In some embodiments, any of the components within the network-accessible services system 110 can communicate with other components (e.g., the user computing devices 102 and auxiliary services 106, which may include monitoring/logging/billing services 107, a storage service 108, an instance provisioning service 109, a message queue service 105, and/or other services that may communicate with the network-accessible services system 110) of the computing environment 100 via the network 104. In other embodiments, not all components of the network-accessible services system 110 are capable of communicating with other components of the computing environment 100. In one example, only the frontend 120 may be connected to the network 104, and other components of the network-accessible services system 110 may communicate with other components of the computing environment 100 via the frontend 120. In some embodiments, any of the auxiliary services 106 may be configured to operate as an event triggering service 106A in order to listen for events specified by users of the auxiliary service and trigger generation of event messages for processing by the network-accessible services system 110, as described in more detail herein. Thus for example, the storage service 108 may be configured to operate as an event triggering service 106A in order to provide the capability of executing user code on the network-accessible services system 110 in response to events as they occur on the storage service 108.

In one embodiment, the one or more auxiliary services 106 may be registered or configured to be polled or queried for events to trigger execution of user codes on the network-accessible services system 110. Such registration or configuration may be provided or enabled via the one or more user interfaces provided to the user computing devices 102. For example, a user interface may provide options for the user to select or specify an auxiliary service 106 as an event-triggering service 106A, such that events on the event-triggering service 106A may trigger generation of event messages, or such that the event-triggering service 106A may be periodically polled or queried for events such as by an intermediary polling system.

In one embodiment, the event triggering service 106A may be configured to associate an event or event type with a particular program code to be executed on the network-accessible services system 110 (that is, the event triggering service 106A may store or have access to data which associates the event with the particular program code). In another embodiment, the event triggering service 106A may not necessarily associate an event or event type with a particular program code to be executed on the network-accessible services system 110, but rather (or in addition) the event triggering service 106A may generate event messages which the network-accessible services system 110 is configured to interpret as being associated with the program code to be executed on the network-accessible services system 110 (that is, the network-accessible services system 110 may store or have access to data which associates the event with the particular program code), In another embodiment, an intermediary system or service may be configured to handle interpretation and routing of event messages to execute the program code, such that neither the event triggering service 106A nor the network-accessible services system 110 may store or have access to the event-to-program code association data. For example, the event triggering service 106A may generate an event message that is agnostic to any particular program code to be executed; and the event message may be routed to the network-accessible services system 110 (or an intermediary system) which evaluates the event message and associated metadata to determine which program code to execute in response, and initiate a corresponding request to execute the program code.

As mentioned above, any of the auxiliary services 106 may be configured to operate as an event triggering service 106A. These include but are not limited to: remote storage systems; database systems; message queue systems (for example, a message queue service provided by the network-accessible services system 110, a message queue system owned and/or operated by a user or client separate from the network-accessible services system 110, and so on); web services; auditing services; health monitoring services (for example, for monitoring health status of a network-accessible services system); logging services; billing services; resource management systems and services (for example, for managing lifecycles and/or ownership of virtual computing environments and the like); and so on.

Users may use the network-accessible services system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request the network-accessible services system 110. The network-accessible services system 110 can handle the acquisition and configuration of compute capacity (e.g., containers, instances, etc., which are described in greater detail below) based on the code execution request, and execute the code using the compute capacity. The network-accessible services system 110 may automatically scale up and down based on the volume by executing additional copies of the user code, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 receives and processes all the requests (sometimes in the form of event messages) to execute user code on the network-accessible services system 110. In one embodiment, the frontend 120 serves as a front door to all the other services provided by the network-accessible services system 110. The frontend 120 processes the requests generated, for example, in response to events, and makes sure that the requests are properly authorized. For example, the frontend 120 may determine whether the user associated with the request is authorized to run the user code specified in the request.

The user code as used herein may refer to any program code (e.g., a program, routine, subroutine, thread, etc.) written in a specific program language. In the present disclosure, the terms "code," "user code," "function," and "program code," may be used interchangeably. Such user code may be executed to achieve a specific task, for example, in connection with an event generated by a particular web application or mobile application developed by the user. For example, the user codes may be written in JavaScript (node.js), Java, Python, and/or Ruby. The request and/or corresponding event message may include an identifier of the event used to identify the function, the user code (or the location thereof), and one or more arguments to be used for executing the user code. For example, the user may provide the user code along with the request to execute the user code in response to the occurrence of one or more events. In another example, the request may identify a previously uploaded program code (e.g., using the API for uploading the code) by its name or its unique ID and one or more triggering conditions for executing the function. In yet another example, the code may be included in the request as well as uploaded in a separate location (e.g., the storage service 108 or a storage system internal to the network-accessible services system 110) prior to the request is received by the network-accessible services system 110. The network-accessible services system 110 may vary its code execution strategy based on where the code is available at the time the request is processed.

The frontend 120 may receive the request to execute such user codes in response to Hypertext Transfer Protocol Secure (HTTPS) requests from a user or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may configured an auxiliary service 106 to operate as an event-triggering service 106A by registering the user code with the auxiliary service 106 and specifying that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. A timed or scheduled job may be implemented using the techniques of this disclosure to, for example, model the job as an event generated by a timer service. For example, the timer service may generate an event message indicating that it is now time to run a user code, and the network-accessible services system 110 may implement a process to run code at a certain time by utilizing the timer service to remind the network-accessible services system 110 to run the user code. In yet another example, the frontend 120 may include or have access to a queue of incoming code execution requests, and when the user's batch job is removed from the network-accessible services system's work queue, the frontend 120 may process the user request. In yet another example, the request may originate from another component within the network-accessible services system 110 or other servers or services not illustrated in FIG. 1.

In yet another example, the request may originate from another component within the network-accessible services system 110 or other servers or services not illustrated in FIG. 1. In some embodiments, a request to execute/activate user codes may be generated in response to an event associated with the user computing device 102 or an auxiliary service 106. For example, in response to an end user uploading a new image from a user computing device to an auxiliary service (such as storage service 108) configured to operate as an event triggering service 106A, the event triggering service 106A can trigger a request to execute/activate a code to generate a thumbnail of the image. The code may be hosted in the active pool 120 or downloaded from a storage service storage service 108 to the network-accessible services system 110.

In any of the examples described above and throughout this disclosure, an event message representative of a request to execute the user code may be initially received by a message queue service 105 and then "queued" (i.e., provided to or placed in a message queue). In one embodiment, every event message may initially be queued, such that they do not trigger execution of the program code until they are retrieved, or requested by and delivered to, the frontend 120. Message events may be placed in the message queue for example by the message queue service 105, such as in response to when an event is detected for which the user has registered to trigger automatic generation of a request to execute user code. In some instances it may be desirable or more practical for the event triggering services 106A to detect such events, trigger generation of an event message, and provide the event message to the message queue service 105. In another embodiment, event messages may be initially received by the message queue service 105 only after delivery of the event message to the frontend 120 has been attempted and refused. For example, the event triggering services 106A may generate the event message and send it to the frontend 120, or may poll the frontend 120 to determine whether the frontend 120 can receive the event message; if the event triggering services 106A receive a reply containing the event message, or an error code, or a reply message indicating the frontend 120 cannot receive the event message, the event triggering services 106A may deliver the event message to the message queue service 105.

Alternatively, the event messages may all be initially received by the frontend 120, and the frontend 120 may determine whether an event message should be processed or sent to the message queue service 105. For example, the frontend 120 may query the event triggering service 106A directly to request and receive event messages for further processing, such as via invocation of an API provided by the event triggering service 106A. In another embodiment, the event triggering service 106A may interface directly with the frontend 120 via one or more APIs and function calls. For example, when an event is detected and an event message is generated, the event triggering system 106A may invoke an API provided by the frontend 120 to provide the event message directly to the frontend 120, without necessarily providing the event message to the message queue service 105. Upon receipt of the event message, the frontend 120 may, for example, poll the worker manager 140 to determine the status of network-accessible services system 110 resources; if the worker manager 140 replies that it cannot provide the resources necessary for executing an instance of the program code to process the event associated with the event message, the frontend 120 may send the event message to the message queue service 105 to be queued. The frontend 120 may send the entire event message to the message queue service 105, or may process the event message (e.g., in the event/request processing module 186) and send to the message queue service 105 only the event message data (e.g., elements of metadata contained in the event message) that the message queue service 105 needs to queue the event message in accordance with the presently described message queue framework and queueing methods.

The message queue service 105 may be implemented as a component of the auxiliary services 106, as illustrated in FIG. 1, or as a different component as described in exemplary embodiments below. The message queue service 105 may receive the entire event message, or a subset of data elements contained in the event message, or simply a reference pointer that identifies a location in physical memory of a data store where the event message is being stored, in various embodiments. Generally, the message queue service 105 may provide to or place in a queue the entire event message, or a subset of data elements contained in the event message (which may be the same or a different subset of data elements as the one received), or the associated reference pointer. More specifically, the message queue service 105 may include one or more queue data structures 105A each defining the structure and containing the queued messages of a logical representation of a queue 105A-1, 2, . . . , N.

In various embodiments, each queue data structure 105A may be a stored record of a database (e.g., a relational database), a file, or another type of data structure, stored in memory (e.g., RAM) during a runtime of the message queue service 105 or in a persistent data store implemented on one or more hard drives or other persistent storage devices of one or more of the hardware computing devices that host the message queue service 105 and/or a network-accessible services system configured to execute the program code, or in both runtime memory and the persistent data store. Further, the queue data structures 105A may be duplicated across multiple persistent storage devices of networked hardware computing devices that implement redundant network-accessible services systems and/or message queue services 105. In some embodiments, these duplicate queue data structures 105A may be concurrently modified to maintain data integrity and provide failover, fault tolerance, and/or cooperative execution capabilities between multiple independent computing environments and/or network-accessible services systems. For example, a computing environment, network-accessible services system, or hardware computing device hosting the queue data structures 105A may be limited in the number of event messages that can be queued; when the queue limit is reached, the message queue service 105 or another component of the host system may route subsequent event messages to a cooperating computing environment, network-accessible services system, or hardware computing device configured to manage the queue data structures 105A for queueing. Exemplary existing queueing systems that may be adapted for use in the message queue service 105 include AMAZON Simple Queue Service, APACHE Active Enqueue, and similar queueing systems. In one example, the queue data structures 105A may be implemented in a distributed database that is persistent across a plurality of database partitions; the message queue system 105 may exchange data directly with the distributed database, and/or may access one or more nodes that are unique to a computing environment or to a network-accessible services system and that serve as endpoints for accessing the distributed database.

In an exemplary embodiment, the queue data structure 105A representing a queue 105A-1 may be a record containing three elements: the first element is a queue identifier that the message queue service 105 uses to access the queue 105A-1; the second element is a context value representing the context 105B-1 associated with the queue 105A-1 as described below; and, the third element is a one-dimensional array, a linked list, an ordered list, or another multiple-element data structure containing the event messages that have been placed in the queue 105A. In another example, the queue data structures 105A may include only a queue identifier and the array for storing event messages; the message queue service 105 may maintain and query a lookup table, a plurality of records, or a similar data structure that associates each queue identifier with the context value representing the context 105B-1 of the corresponding queue 105A-1. In another embodiment, the array of the queue data structure 105A may have a preset number of elements, representing a maximum number of event messages that can be placed in the queue. Alternatively, there may be no specific limit on the number of elements in the array, and the size of the corresponding queue 105A-1 may be limited by other system limitations, such as a total amount of memory available to the message queue service 105. In embodiments where the queued event messages are represented in a linked list, the list element may include a reference to the element before and/or after it, as well as information identifying the queued event message the element represents. In various embodiments of representing event messages in the queue 105A-1, the array, linked list, and the like, may be configured to store reference pointers, event message identifiers, data structures containing event message data, and/or the event message itself.

Implemented on physical computing devices in the above manner, the message queue service 105 may queue event messages across multiple queues 105A-1-N each associated with a context 105B-1-N. Such queueing naturally includes accessing individual queues 105A-1-N to add and remove event messages, and may further include managing a logical "queue pool" containing the active queues (e.g., N active queues in accordance with FIG. 1), according to a queue framework and handling rules as described below. As stated above and described in more detail below, the message queue service 105 is configured to obtain information from the event message that identifies, or facilitates identification of, one or more contexts of the event that triggered generation of the event message. The relevant contexts for queueing purposes may be contained in the event message, or the message queue service 105 may determine that the event message information references external data that identifies one or more of the relevant contexts. The message queue service 105 may use this information to generate and send transmissions over the network 104 to external resources, which external resources may respond by providing the external data to the message queue service 105 (again via the network 104 and any other necessary networks, such as the internet).

Additionally or alternatively, the message queue service 105 may be configured to allow ordering of event messages, or distribution thereof across the active queues, or selection of queued event messages for delivery, so that certain event messages may receive a higher priority. In another example, the message queue service 105 may be specifically or specially configured to facilitate transportation of certain types of programmatic events, such as database operations, certain types of data suitable for batch processing, and so on. In one embodiment the message queue service 105 may be configured to provide streaming, and/or ordered transport of event messages (for example, as a shared set of data). In some embodiments, the message queue service 105 may scale the capacity and specificity of the queue pool up and down, according to dynamic system properties such as the volume of event messages received during a particular time period, by adding, removing, or replacing active queues.

When there are queued event messages in the active queue(s), the frontend 120 may obtain the next event message from the message queue service 105. For example, the frontend 120 may poll the message queue service 105 and retrieve event messages for further processing by the network-accessible services system 110. The polling may, in some embodiments, occur according to a preset schedule, such as at particular times of day or at regular intervals. In other embodiments, the frontend 120 may poll the message queue service 105 when sufficient resources of the network-accessible services system 110 are available to execute a new instance (or re-execute an idle instance) of the program code; the frontend 120 may continuously poll the message queue service 105 for new event messages while the network-accessible services system 110 is not operating at capacity (i.e., the network-accessible services system 110 has resources available to process the event messages, and is not operating a maximum allowable number of concurrent program code executions). In accordance with the descriptions of message queue service 105 operations herein, the message queue service 105 may receive a request from the frontend 120 (or another component of the network-accessible services system 110) for the next queued event message to be processed, and the message queue service 105 may respond by selecting a queued event message from one of the plurality of queues 105A-1-N and delivering the selected event message to the frontend 120.

A user request may specify one or more third-party libraries (including native libraries) to be used along with the user code. In one embodiment, the user request includes a package file (for example, a compressed file, a ZIP file, a RAR file, etc.) containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the network-accessible services system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the network-accessible services system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the network-accessible services system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the network-accessible services system 110 may inspect the request and look for the flag or the header, and if it is present, the network-accessible services system 110 may modify the behavior (e.g., logging facilities) of the container in which the user code is executed, and cause the output data to be provided back to the user. In some embodiments, the behavior/mode indicators are added to the request by the user interface provided to the user by the network-accessible services system 110. Other features such as source code profiling, remote debugging, etc. may also be enabled or disabled based on the indication provided in the request.

In some embodiments, the network-accessible services system 110 may include multiple frontends 120. In such embodiments, a load balancer may be provided to distribute the incoming requests and/or event messages to the multiple frontends 120, for example, in a round-robin fashion.

The warming pool manager 130 ensures that virtual machine instances are ready to be used by the worker manager 140 when the network-accessible services system 110 receives a request to execute user code on the network-accessible services system 110. In the example illustrated in FIG. 1, the warming pol manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the network-accessible services system 110 and added to the warming pool 130A prior to receiving a code execution request that will be executed on the virtual machine instance. In other embodiments, the warming pool manager 130 communicates with an auxiliary virtual machine instance service (e.g., an instance provisioning service 109) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the network-accessible services system 110 and one or more virtual machine instance services to acquire and maintain compute capacity that can be used to service code execution requests received by the frontend 120. In some embodiments, the network-accessible services system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the network-accessible services system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the network-accessible services system 110, the user interface may prompt the user to specify one of the predetermined operating conditions for executing the user code. In another example, the service-level agreement (SLA) for utilizing the services provided by the network-accessible services system 110 may specify a set of conditions (e.g., programming languages, computing resources, etc.) that user requests should satisfy, and the network-accessible services system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the network-accessible services system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the network-accessible services system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the network-accessible services system 110 to perform one or more techniques described herein. Although only the storage service 108 is illustrated in the example of FIG. 1, the computing environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the network-accessible services system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the network-accessible services system 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail below with reference to FIG. 4.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the network-accessible services system 110 may provide data to one or more of the auxiliary services 106 as it services incoming code execution requests. For example, the network-accessible services system 110 may communicate with the monitoring/logging/billing services 107. The monitoring/logging/billing services 107 may include: a monitoring service for managing monitoring information received from the network-accessible services system 110, such as statuses of containers and instances on the network-accessible services system 110; a logging service for managing logging information received from the network-accessible services system 110, such as activities performed by containers and instances on the network-accessible services system 110; and a billing service for generating billing information associated with executing user code on the network-accessible services system 110 (e.g., based on the monitoring information and/or the logging information managed by the monitoring service and the logging service). In addition to the system-level activities that may be performed by the monitoring/logging/billing services 107 (e.g., on behalf of the network-accessible services system 110) as described above, the monitoring/logging/billing services 107 may provide application-level services on behalf of the user code executed on the network-accessible services system 110. For example, the monitoring/logging/billing services 107 may monitor and/or log various inputs, outputs, or other data and parameters on behalf of the user code being executed on the network-accessible services system 110. Although shown as a single block, the monitoring, logging, and billing services 107 may be provided as separate services.

In some embodiments, the network-accessible services system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). Another time period can be determined as the difference in time between (1) detection of an event on an event-triggering service and (2a) receiving a request to execute the user code (e.g., received by a frontend) and/or (2b) initiating execution of the user code (e.g., in a container on a virtual machine instance associated with the user). Another time period can be determined as the difference in time between (1) retrieving, accessing, or receiving an event message (e.g., directly or indirectly from on an event-triggering service) and (2) initiating processing of a request to execute the user code (e.g., in a container on a virtual machine instance associated with the user). The network-accessible services system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the network-accessible services system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The worker manager 140 may include an instance allocation unit for finding compute capacity (e.g., containers) to service incoming code execution requests and a user code execution module for facilitating the execution of user codes on those containers. An example configuration of the frontend 120 is described in greater detail below with reference to FIG. 2.

Figure 2:
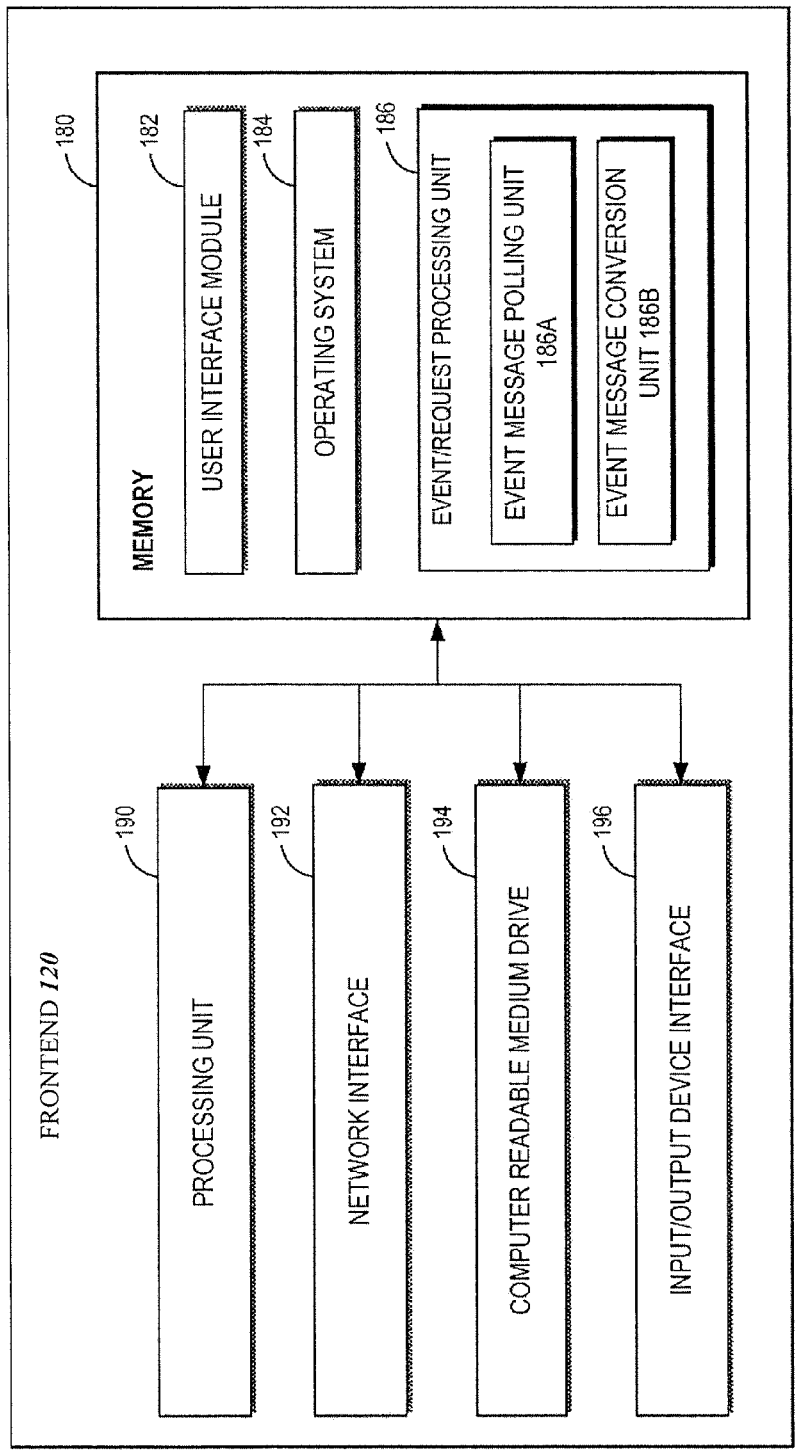
FIG. 2 is a block diagram of an exemplary computing device architecture providing a frontend for processing user requests to execute program codes.

FIG. 2 depicts a general architecture of a computing system (referenced as frontend 120) that processes event messages for user requests to execute program codes in the network-accessible services system 110. The general architecture of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface module 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface module 182, the memory 180 may include an event/request processing unit 188 which may include an event message polling unit 186A and an event message conversion unit 186B that may be executed by the processing unit 190. In one embodiment, the user interface module 182, the event message polling unit 186A, and the event message conversion unit 186B individually or collectively implement various aspects of the present disclosure, e.g., processing an event message for a request to executed user code, as described herein. In another embodiment, a separate polling service may be implemented, for example via a polling fleet configured to poll an event source or a message queue and perform at least an initial message conversion or processing to prepare the event message for further processing by the frontend 120 and/or another component of the network-accessible services system 100.

The event message polling unit 186A periodically polls for event messages to be processed into requests to execute user code. For example, the event message polling unit 186A may periodically access a message queue, such as the message queue service 105 or any other message queue service or message bus, to determine or detect whether an event message has been placed in the message queue for processing by the network-accessible services system 110. An event message may be placed in the message queue according to, for example, the routine described herein with reference to FIG. 3. In response to determining or detecting an event message in the message queue, the event message polling unit 186A may retrieve the message event from the message queue and initiate further processing of the event message as further described herein. In another embodiment, the event message polling unit 186A may poll the event-triggering service 106A directly rather than from a message queue. For example, some event-triggering services such as certain types of databases may support direct polling of event messages that need not necessarily rely on an intermediary message queue.

The event message conversion unit 186B manages the conversion of the event message (e.g., as accessed or retrieved from a message queue such as the message queue 105) into a request to execute user code. In one embodiment the event message is generated in a format representative of a remote procedure call to facilitate rapid conversion and/or immediate function invocation by the network-accessible services system 110 when the event message is processed. Such an implementation enables a high degree of functional transparency and reduced latency between an auxiliary system responding to an event trigger and the network-accessible services system 110 processing the event message generated by the auxiliary system responsive to the event trigger.

While the event message polling unit 186A and the event message conversion unit 186B are shown in FIG. 2 as part of the frontend 120, in other embodiments, all or a portion of the event message polling unit 186A and the event message conversion unit 186B may be implemented by other components of the network-accessible services system 110 and/or another computing device. For example, in certain embodiments of the present disclosure, another computing device in communication with the network-accessible services system 110 may include several modules or components that operate similarly to the modules and components illustrated as part of the frontend 120. In some embodiments, the frontend 120 may further include components other than those illustrated in FIG. 2.

Figure 3:
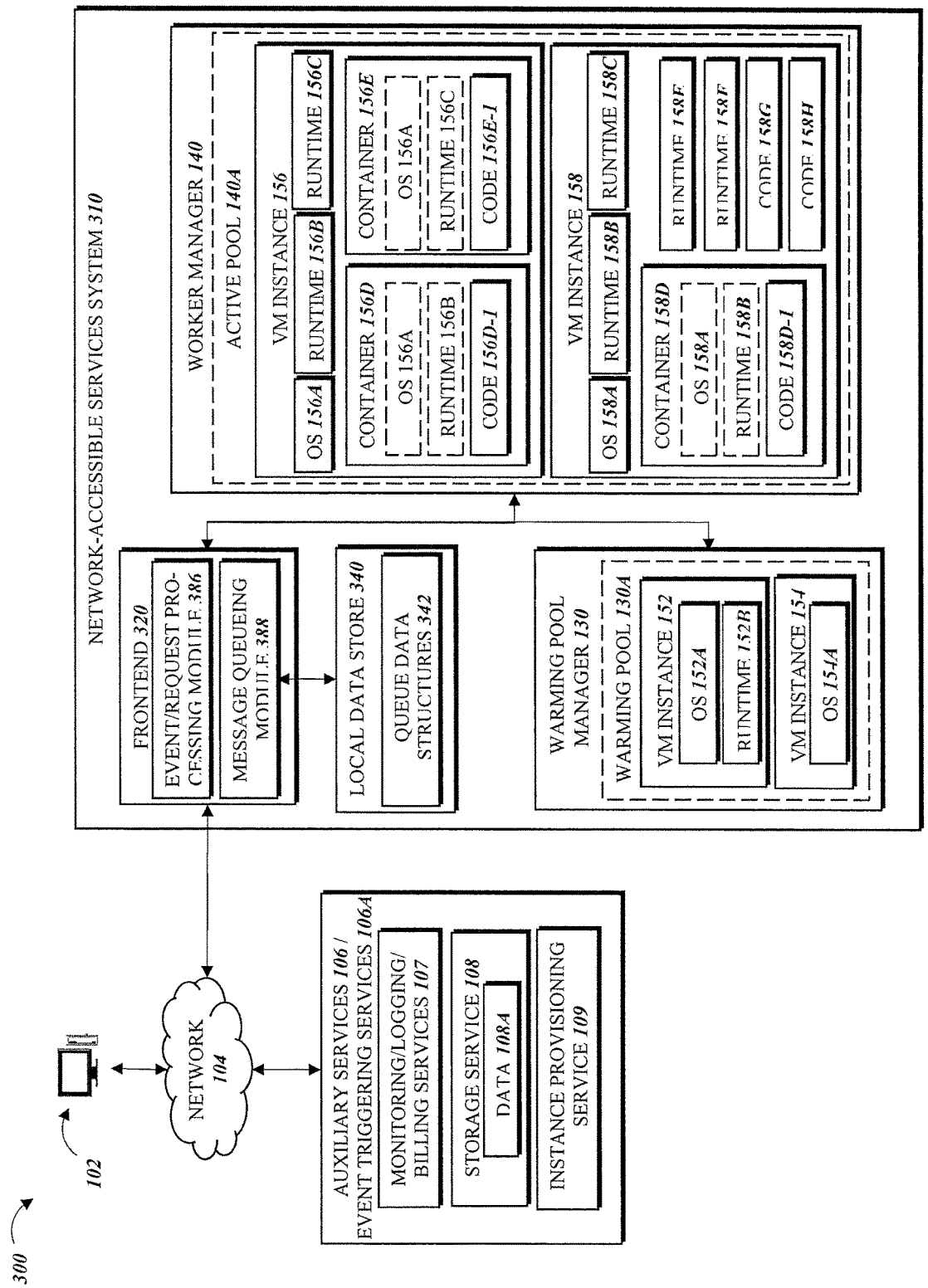
FIG. 3 is a diagram illustrating another exemplary system for queueing event messages across multiple queues, in accordance with the present disclosure.

FIG. 3 illustrates another exemplary computing environment 300 in which a network-accessible services system 310 operates in conjunction with the auxiliary services 106/event triggering services 106A to process requests to execute user code. The resulting program code execution may, in some embodiments and under some use conditions, be equivalent to the results of the network-accessible services system 110 and computing environment 100 of FIG. 1; however, the computing environment 300 may exhibit performance improvements over the computing environment 100 of FIG. 1 by replacing the message queue service 105, which is outside the network-accessible services system 110, with a message queueing module 388 and associated local data store 340 that are present within network-accessible services system 310 (in other embodiments, the local data store 340 may be external to the network-accessible services system 310). The message queueing module 388 may be a component of a frontend 320 or of another component, or may be a standalone component, of the network-accessible services system 310. In the illustrated embodiment, the frontend 320 may perform the functions of the frontend 120 of FIG. 1 while further performing the functions of the message queue service 105. That is, the message queueing module 388 may include program instructions that, when executed, configure the frontend 320 to receive and queue event messages and to deliver queued event messages to the event/request processing module 386 of the frontend 320 according to any of the embodiments of the message queue service 105 described above with respect to FIG. 1. The local data store 340 may contain the queue data structures 342 that, as described above with respect to the queue data structures 105A, represent the active queues and the queued event messages therein; the message queueing module 388 may manage the queue pool and perform queue-specific tasks as described above by accessing the local data store 340. Once an event message is delivered to the event/request processing module 386 for processing, the execution of program code by the frontend 320, warming pool manager 130, and worker manager 140 proceeds as described above with respect to FIG. 1.

Figure 4:
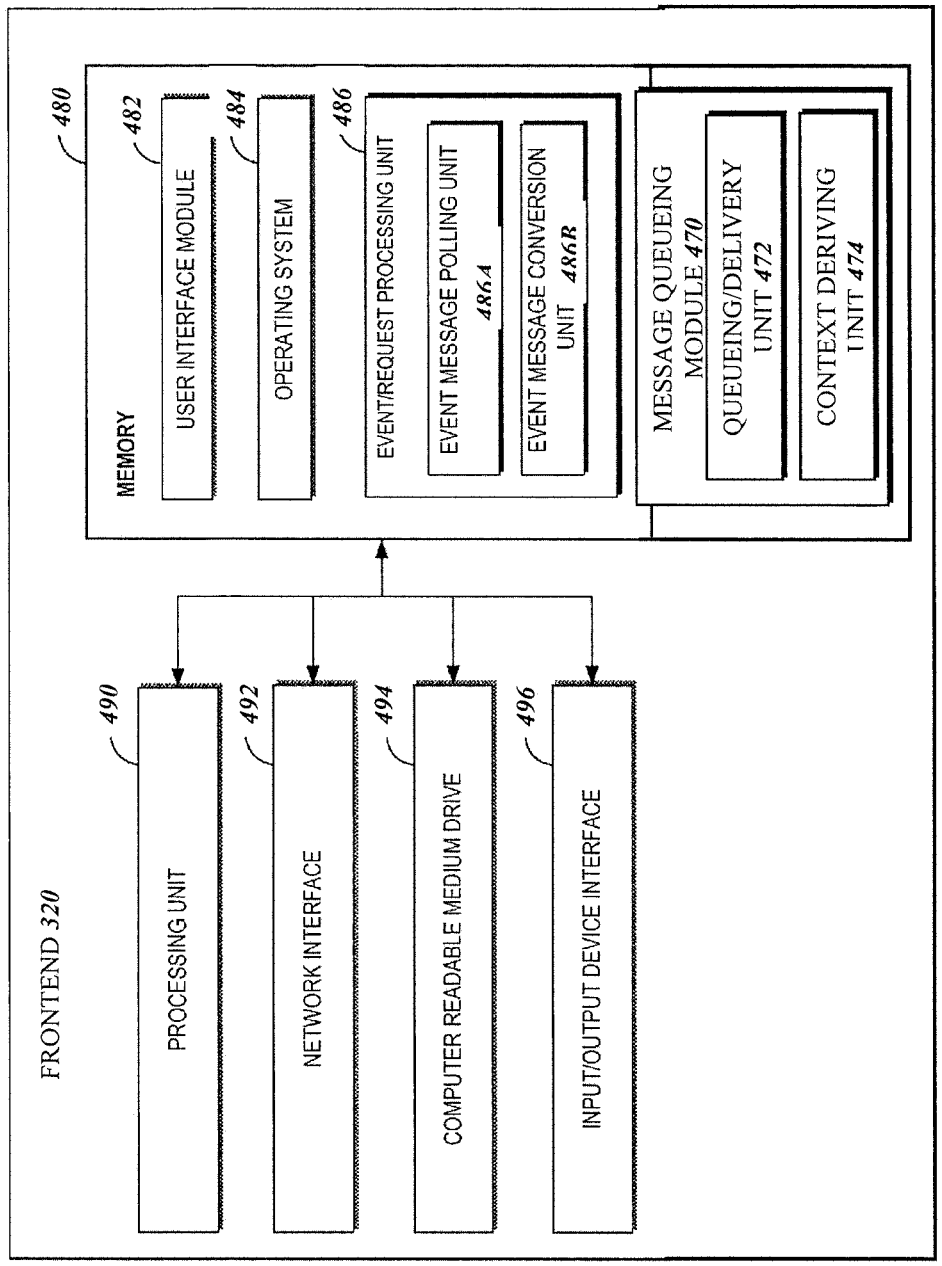
FIG. 4 is a block diagram of another exemplary computing device architecture providing a frontend for processing user requests to execute program codes.

FIG. 4 illustrates a general architecture of a computing system (referenced as frontend 320) that processes event messages for user requests to execute program codes in the network-accessible services system 310. The general architecture of the frontend 320 depicted in FIG. 4 includes an arrangement of computer hardware and software modules that may be used to implement aspects of the present disclosure. The hardware modules may be implemented with physical electronic devices, as discussed in greater detail below. Various components of the frontend 320, including the processing unit 490, network interface 492, computer readable medium drive 494, and input/output device interface 496, operate as described with respect to their counterparts in FIG. 2. Similarly, memory 480 of the frontend 320 may include a user interface module 482, an operating system 484, and an event/request processing unit 486 including an event message polling unit 486A and an event message conversion unit 486B, which have counterparts described in FIG. 2.

The memory 480 may further include program instructions, stored data, and other information for implementing the message queueing module 470 in the frontend 320. The message queueing module 470 and the event/request processing unit 486 may communication and/or share data that enables the event message polling unit 486A to send event messages to and/or receive event messages from the message queueing module 470. Additionally, the event message conversion unit 486B may perform some processing of an event message to produce, for example, a data structure representing the event message and used by a queueing/delivery unit 472 to queue the event message. Accordingly, the queueing/delivery unit 472 performs the reading and writing of data into the queues that adds and removes queued event messages and delivers event messages as described above. A context deriving unit 474 of the message queueing module 470 may analyze an event message, as described below, in order to determine one or more relevant contexts of the event message. The queueing/delivery unit 472 then uses the context(s) to queue the event message in the appropriate queue.

Figure 5:
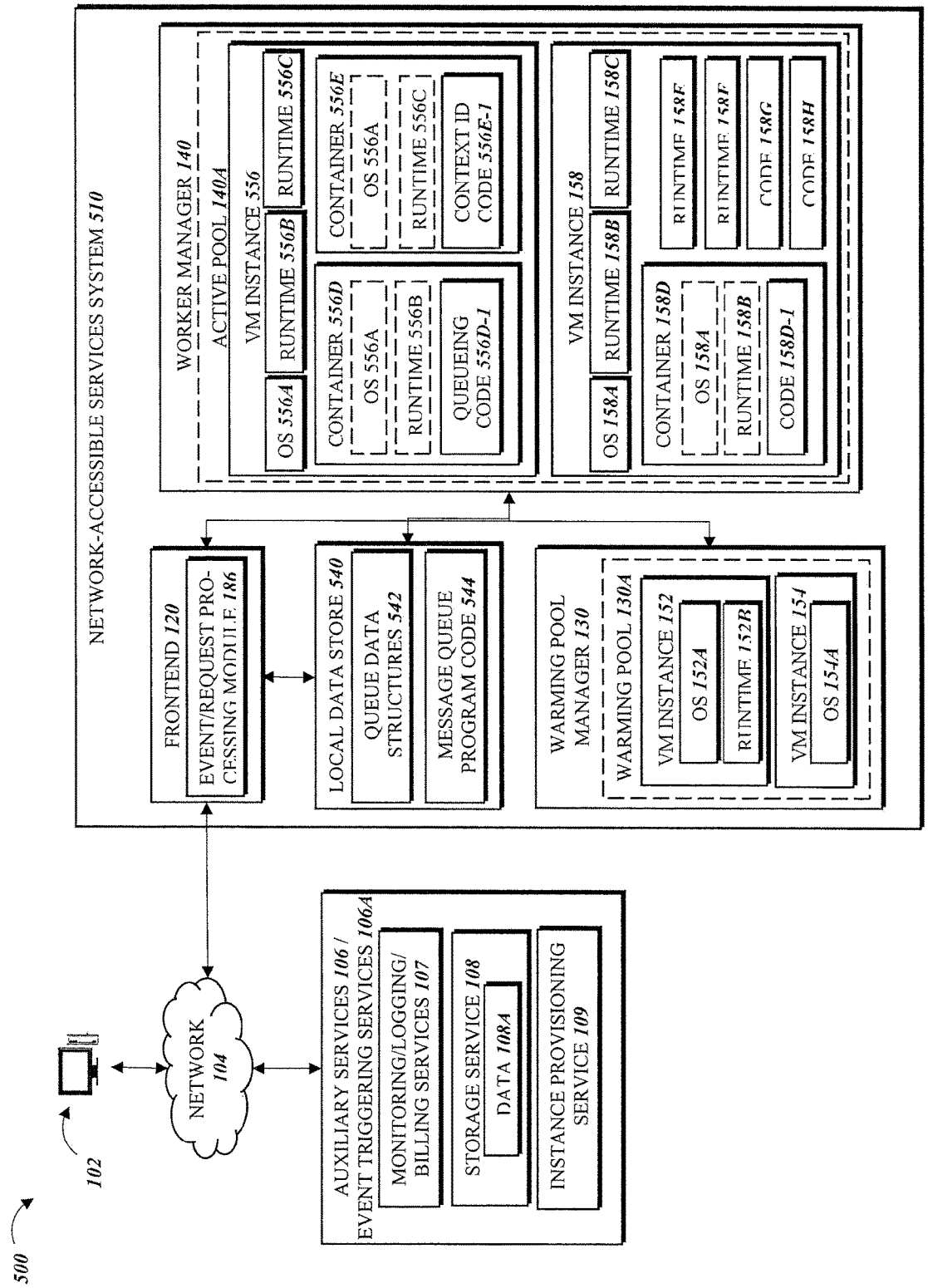
FIG. 5 is a diagram illustrating yet another exemplary system for queueing event messages across multiple queues, in accordance with the present disclosure.

FIG. 5 illustrates another exemplary computing environment 500 in which a network-accessible services system 510 operates in conjunction with the auxiliary services 106/event triggering services 106A to process requests to execute user code. The resulting user code execution may, in some embodiments and under some use conditions, be equivalent to the results of the network-accessible services systems 110 and 310 of FIGS. 1 and 3; however, the computing environment 500 may exhibit performance improvements over the computing environments 100 and 300 of FIGS. 1 and 3 by performing the message queue functions with program code that is executed in the same manner as the network-accessible services system 510 executes user code. That is, to provide the event message queueing functions described herein, the frontend 120, warming pool manager 130, and worker manager 140 together may coordinate execution of one or more instances of message queue program code 544 within one or more containers 556D, 556E of a virtual machine instance 556. The executing instances 556D-1, 556E-1 of the message queue program code 544 cooperate to receive, queue, and deliver event messages, and may manage the queue pool, as described above. In one embodiment, one or more instances of all or part of the message queue program code 544 are executing at all times. Additionally or alternatively, the frontend 120 may initiate an instance of the message queue program code 544 only when an event message must be stored in a queue, or when a queued event message must be retrieved for processing.

In one embodiment, the message queue program code 544 may be a single program that performs all of the queueing functions. In other embodiments, the message queue program code 544 may be composed of a plurality of discrete programs that each perform a certain task. For example, the message queue program code 544 may include queueing code and context identification code. An instance 556D-1 of the queueing code may be configured to receive either or both of an event message for queueing, and may queue the message, and a request for a queued event message, and may retrieve and deliver the queued event message (in other embodiments, the queueing and delivery functions may be performed by separate program code). The queueing code thus may access queue data structures 542 in the local data store 540 as described above. An instance 556E-1 of the context identification code may be configured to receive an event message and, using context definitions (e.g., stored in the local data store 540) as described below, may identify one or more relevant contexts of the event message. In an exemplary embodiment, the context identification code may be configured to finish executing by returning the identified context(s) to the frontend 120, which then passes the context(s) to an instance of the queueing code to queue the event message. In another example, the instance 556D-1 of the queueing code may invoke the instance 556E-1 of the context identification code, passing the event message to the instance 556E-1 and receiving the context(s) when the instance 556D-1 finishes executing and returns.

Figure 6A:
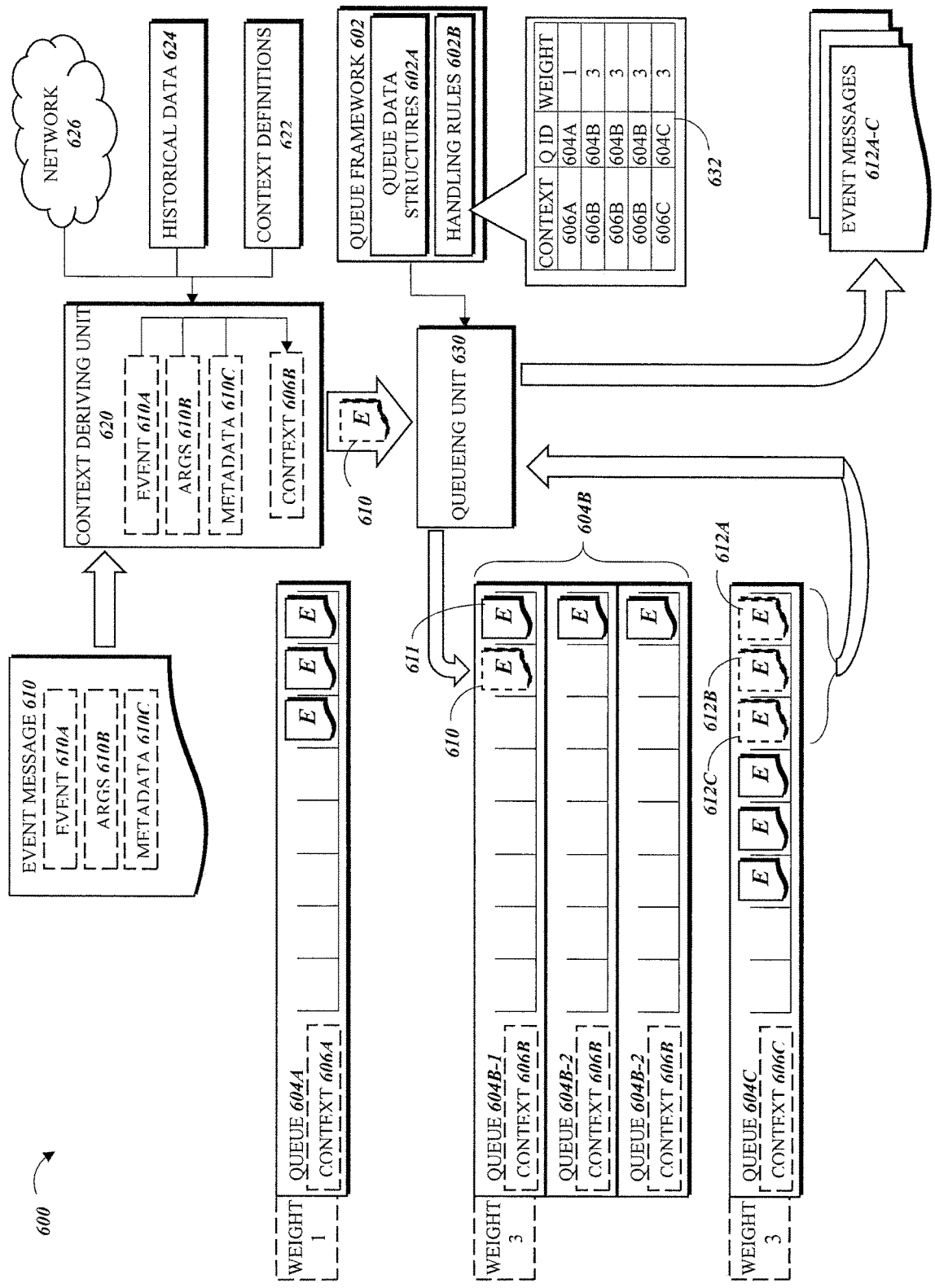
FIG. 6A is a diagram illustrating processing of an event message by components of a message queue service in accordance with the present disclosure.

FIG. 6A is a logical diagram 600 of data inputs and processing performed by the message queueing system of any of the above embodiments to queue and deliver an event message 610. The event message 610 may include information that the system can use to determine the context(s) of the event associated with the event message 610, in order to queue the event message 610 by context. Such information may include event data 610A identifying the event, one or more arguments 610B that specify how the associated request for execution of the program code is to be processed, and/or one or more elements of metadata 610C that further describe the event, the event source, the requestor, other resources to be accessed for processing the event, and the like.

FIG. 6B illustrates a method 650 for queueing the event message 610 as shown in FIG. 6A. Thus, with reference to FIGS. 6A-B, the event message 610 is received (step 652) and then processed by a context deriving unit 620 that reads, extracts, parses, or otherwise interprets the event message 610 data to determine one or more contexts 606B that can be used to queue the event message 610. The context deriving unit 620 may access a data store of one or more context definitions 622 that describe how the context deriving unit 620 can find the context 606B using one or more of the event data 610A, arguments 610B, and metadata 610C. Furthermore, the context definitions 622 may identify context-relevant data outside of the event message 610. For example, the context definitions 622 may indicate that the context deriving unit 620 should retrieve certain historical data 624 describing previous processing results for similar event messages, such as previously received event messages from the same event source or same geographic region, or referencing the same URL to access, or arriving at the same date or time of day. In another example, the context definitions 622 may specify that the context deriving unit 620 must communicate (e.g., over a network 626) with other electronic resources, such as a resource identified in the arguments 610B, to determine the context. The external resource may, for example, return to the context deriving unit 620 information for identifying the requestor, such as a user account identifier.

The context definitions 622 may be provided by a user, such as by the owner of the program code accessing a user interface as described above to enter the context definitions 622 that will be used to generate context-specific queues. In one embodiment, a context definition 622 can identify a context type and a format in which contexts of the context type will appear in the data associated with the event message 610. For example, the context type may be a user ID. Each potential requestor may have a unique value for the user ID context type; this unique value is the context value for the context type. To define a format, the context definition may, for example, include a pattern of text and a mask identifying a string or another group of characters within the pattern. The context deriving unit 620 may first match the pattern of the format to a string present in the event message 610, data; if the pattern appears, the context deriving unit 620 uses the mask to extract the string as the context value. For example, the event message 610 may be configured to contain a path, such as to an object or event source related to the event, wherein the path has the same naming convention for all users and for all files, e.g.:

\\virus-scan\SSS\MM\DD\TTTTTT\UUUU.dat where SSS is a three-character string identifying the event source, MM is a two-digit month, DD is a two-digit day, TTTTTT is a six-digit time, and UUUU is a four-character user ID. A context definition 622 or a plurality of context definitions 622 may include a format for identifying this pattern in the event message 610 data, and a mask that extracts one or more of the event source, date, time, and user ID.

Generally, the context definitions 622 may identify any type of context and use any format provided by the user, provided the user also encodes the event messages 610 with the appropriate identifying information. Thus, for example, the metadata 610C of the event message 610 can be configured to contain any desired values, and the context deriving unit 620 can be configured to read the values as needed. The context definitions 622 may define contexts of different "granularity," defining different context types where the associated context values identify different groups with different amounts of requestors as members. For example, a first context definition may pertain to a user ID, which is unique to every potential requestor and is the finest (i.e., most specific) level of granularity. A second context definition may define a type of user group, such as a corporate entity that has dozens or hundreds of users; this definition may have a format that identifies the requestor as a member of the group using a group ID, a group-specific event source, a certain URL or other external resource named in the event message, or another suitable identifier. A third context definition may define different geographic regions as the context type, and may use an IP address of the request or event source to determine the context value.

Other context definitions 622 may depend on an event type of the event, such as a first definition that identifies the event as a received text message by determining that the event source is a mobile device (or that headers or other metadata of the text message indicate it as such), and a second definition that identifies the event as a received email message. Additionally, context definitions 622 may include instructions for combining two or more contexts into a single context.

The context deriving unit 620 uses the context definitions 622 to determine, from the event message 610 data and potentially other input, the context 606B that can be used to queue the event message 610. In one embodiment, the context deriving unit 620 compares the event message 610 data to the context definitions 622 (step 654) to determine a direct match (i.e., the event message 610 data contains the context value). If there is a match, the context value is extracted (step 660). If not, the context deriving unit 620 may query other sources, such as external resources, for information to identify the context (step 658). Then, the event message 610 and its context 606B are passed to a queueing unit 630.

The queueing unit 630 accesses a queue framework 602 to determine where to store the event message 610. The queue framework 602 may be a data store or a memory-resident data structure that represents the queue pool. The queue framework 602 includes the queue data structures 602A that, as described above, contain the queued event messages of the active queues. The queue framework further includes handling rules 602B. The queueing unit 630 interprets the handling rules 602B to determine which queue 604A, 604B (divided conceptually as described below into subqueues 604B-1-3), 604C receives event messages having the context 606B. The handling rules 602B may include, for example, the lookup table 632 associating each relevant context with a queue identifier. The queueing unit 630 finds the appropriate queue 604B (step 662), for example by finding the context 606B in the lookup table 632 and identifying the corresponding queue 604B identifier. The queueing unit 630 may then update the system state (step 664), such as by incrementing a tracked number of queued event messages in the queues, and places the event message 610 in the next open slot behind any previously queued event messages 611 (step 666).

In some embodiments, the handling rules 602B can prioritize a single context by providing a "weight" of the associated queue. In one embodiment, the queue weight may be implemented by providing multiple queues for the higher-weighted context. In the illustrated example, the context 606B is allocated three queues 604B-1-3, which increases the frequency that a queue containing queued event messages of the context 606B is selected to provide an event message for delivery, using either a round-robin or random selection process as described below. The multiple queues 604B-1-3 may each be a separate queue stored in the queue data structures 602A, or the handling rules 602B may simply include a plurality of (e.g., three) entries for the base queue 604B in the lookup table 632, so that the queueing unit 630, selecting from the lookup table entries for a delivery queue, is more likely to select the base queue 604B. The handling rules 602B may also include rules for scaling the queue pool up and down by creating new active queues, replacing active queues with new queues that may have different contexts from the previous active queues, and/or assigning a different context to one or more of the active queues, as described further below.

FIG. 6C illustrates an exemplary method 680 for delivering a queued event message for processing. Thus, with reference to FIGS. 6A and 6C, to deliver a queued event message, such as upon receipt (step 682) of a request from the frontend for the next event message, the queueing unit 630 may select one of the active queues (step 684). In one embodiment, the selection may be random, such as by using a random number generator to generate a random value. The random value may be a queue identifier for the selected queue, or the random value may identify an entry in the lookup table 632 containing the queue identifiers. Random selection of the queue, in contrast to sequential or other ordered selection, avoids the need to maintain a pointer or other reference to the next queue to be selected, which can complicate maintenance of redundant sets of queues in disparate systems or physical locations, but in another embodiment the queueing unit 630 may maintain a reference to the previously selected queue, and may select the sequentially next queue in a round-robin fashion. If the selected queue is empty (step 686), the queueing unit 630 may select the next queue.

The weight of a queue 604C may be implemented, in addition or in alternative to the provision of multiple queues as described above, by providing handling rules 602B that direct the queueing unit 630 to select a plurality of (e.g., three) queued event messages 612A-C from the queue 604C each time the queue 604C is selected. Thus, the queueing unit 630 may determine, based on the weight, how many queued event messages to retrieve (step 688) and may then retrieve the queued event messages (step 690). To update the system state (step 692), the queueing unit 630 may decrement the count of queued event messages by one, reflecting the delivery of one message, or by the number of event messages 612A-C retrieved from the selected queue 604C, reflecting the removal of those event messages 612A-C from the queue 604C. The queueing unit 630 may deliver the event messages (step 696) by delivering the first event message 612A retrieved from the queue 604C and retaining the retrieved but undelivered event messages 612B-C as priority event messages to be delivered in response to the next consecutively received requests.

Figure 7A:
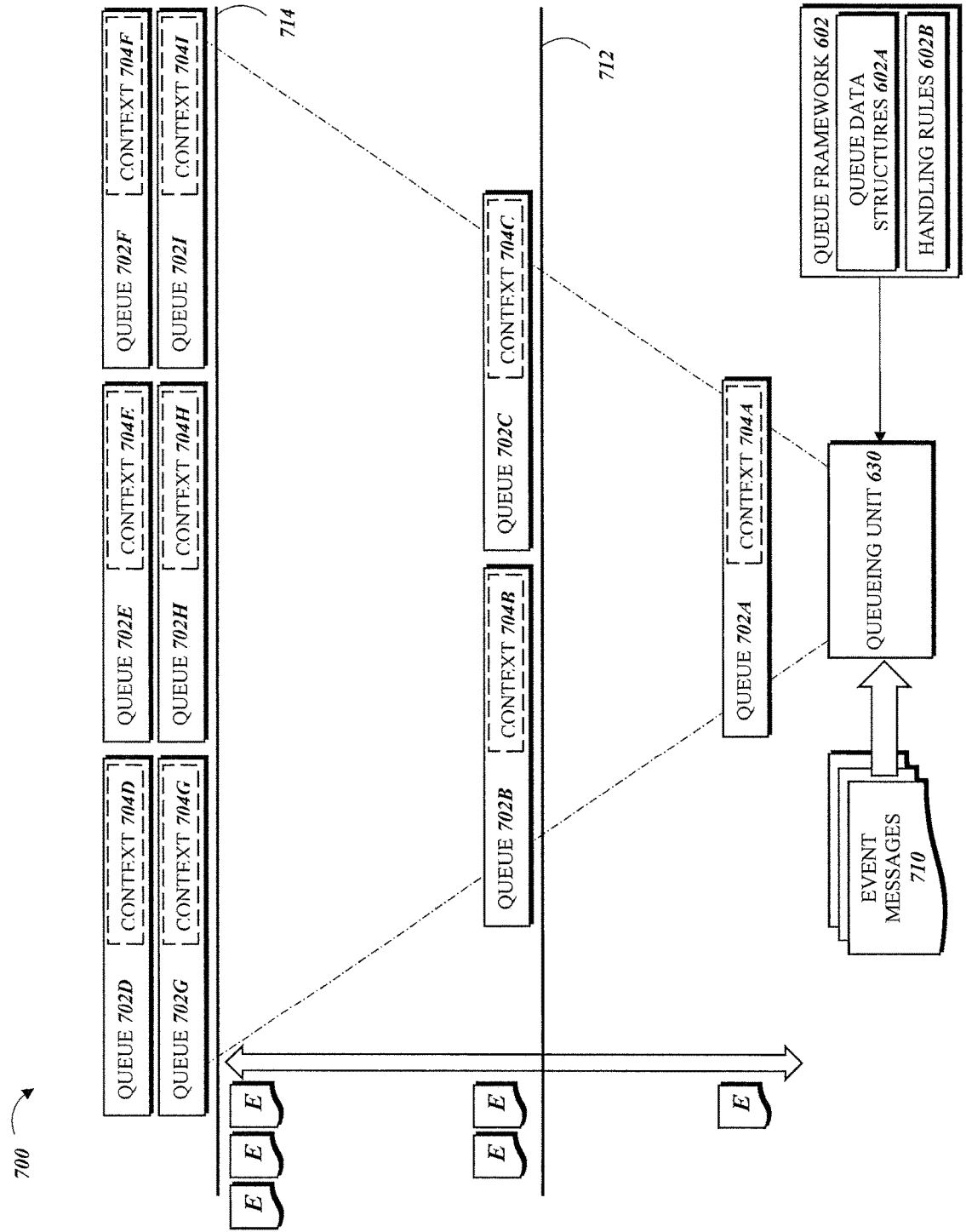
FIG. 7A is a diagram illustrating scaling of a queue pool, in accordance with the present disclosure.

FIG. 7A illustrates a dynamic queue pool 700 that, in accordance with the description above, has a scaling capacity based on the volume and/or frequency of received event messages 710 that must be queued by the queueing unit 630. In one embodiment, the volume or frequency is measured by counting received event messages. Additionally or alternatively, the volume may be monitored using a count of the number of queued event messages in the active queue(s). The handling rules 602B may include one or more thresholds 712, 714 of event message volume. The queueing unit 630 may be configured to reorganize the queue pool, increasing or decreasing the number of queues and/or the granularity of the context types when the volume exceeds or drops below a threshold volume. The illustrated example shows three levels of an exemplary queue pool that provides increasing granularity of the relevant context types as the event message volume increases, so that requestors receive a relatively fair treatment of their requests.

At a first level, when event message volume is low, a single queue 702A having an associated context 704A that does not exclude any event messages from the queue 702A, or having no context at all, is sufficient to ensure fair treatment—to wit, using multiple queues at the first level would not produce a more even distribution of event message delivery among different requestors. Once event message volume exceeds a first threshold 712, the queueing unit 630 is directed to move the queue pool to the second level, and replace the single queue 702A with two or more queues 702B, 702C in order to optimize event message delivery for events of two different contexts 704B, 704C. The contexts 704B, 704C may be context values belonging to different context types or the same context type. For example, the context type may be a geographic region, and the context values may be "United States" and "Europe;" thus, the queueing unit 630 may queue event messages for events originating in the U.S. in queue 702B, and event messages for events originating in Europe in queue 702C. Finally, when the event message volume exceeds a second threshold 714 higher than the first threshold 712, the queueing unit 630 is directed to move the queue pool to the third level, and replace the queues 702B-C with a larger number of queues 702D-I with associated contexts 704D-I having an even finer granularity, such as a user ID context type. When the event message volume drops back below one of the thresholds 712, 714, the queueing unit 630 is directed to move the queue pool to the corresponding level and replace the active queues accordingly.

In one embodiment, the queueing unit 630 may replace the active queues by retrieving all of the queued event messages from each of the active queues, allocating queue data structures 602A for the new active queues corresponding to the contexts of the new level, and redistributing the event messages into the new queues according to their context. In another embodiment, instead of removing the active queues, the queueing unit 630 may replace one or more of the active queues by assigning a different context to the active queue in accordance with the handling rules 602B. The queue data structures 602A of inactive queues may remain in the data storage, with an unused context or no context assigned thereto. In one example of scaling the queue pool 700 upward, the queueing unit 630 may assign new contexts to each of the active queues and to a preset number of inactive queues. In an example of scaling the queue pool 700 downward, the queueing unit 630 may assign new contexts to a required number of the active queues, and may assign an inactive context or remove the context of any active queues that are not needed. Thus, the context deriving unit 620 may begin to derive the context of subsequently received event messages using the context definitions 622 to which the newly assigned contexts belong. Any previously queued event messages may remain in their respective queues, and the queueing unit 630 may proceed to deliver those messages by servicing the active queues, and any newly inactive queues still containing queued event messages, in accordance with the handling rules 602B.

Figure 7B:
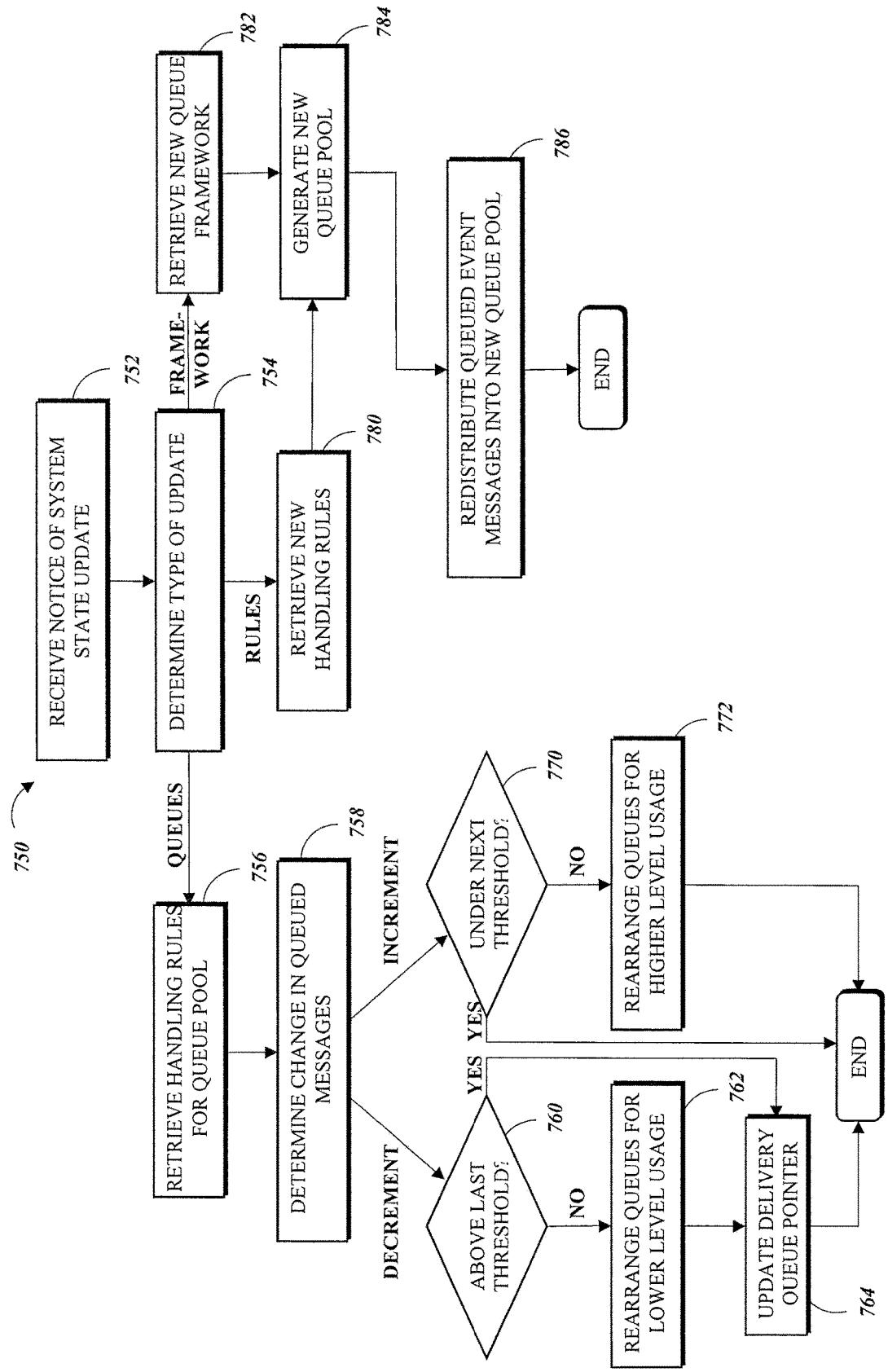
FIG. 7B is a flow diagram of an exemplary method for processing system updates related to a queueing system of the present disclosure.

FIG. 7B illustrates an exemplary method 750 for processing system state updates. Such updates can be produced by queueing service operations, as described in FIGS. 6A-C, or by user changes to the handling rules or to the underlying queue framework. When the system receives notice that the system state has been updated (step 752), the system may first determine what type of update occurred (step 754). If the update was a change automatically recorded by the queueing services, the system may obtain the handling rules 756 and then determine what type of change occurred (step 758). If the change was a decrement in the number of queued messages (associated with a delivery of a queued event message), the system may determine, using the handling rules, whether the volume of incoming event messages remains above the last-exceeded threshold (step 760). If not, the system may reconfigure the queue pool for a lower level of usage (step 762). Then, or if the last threshold remains exceeded, the system may update a pointer to the next queue to be selected as the delivery queue (step 764), according to the above description. If the change was an increment in the number of queued messages (associated with queueing a new event message), the system may determine, using the handling rules, whether the volume of incoming event messages remains below the next threshold (step 770). If not, the system may reconfigure the queue pool for a higher level of usage (step 772).

If the user has updated the handling rules and/or the queue framework, the system may retrieve the new handling rules (step 780) and/or new queue framework (step 782) and, using the new information, may generate a new queue pool (784) that incorporates the changes made by the user to either the handling rules or the queue framework. Then, the system may redistribute the queued event messages in the "old" queue pool into the new queue pool (step 786) as described above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system for processing requests to execute a program code on a network-accessible services system, the system comprising:

an electronic data store configured to store:

a first definition record comprising information for identifying a context value belonging to a first context type;

a first context record comprising a first context value belonging to the first context type, and a first queue identifier associated with the first context value; and a second context record comprising a second context value and a second queue identifier associated with the second context value; and a message queue service comprising one or more hardware computing devices executing specific computer-executable instructions and configured to store data in a memory, the message queue service in communication with the electronic data store and with a request processing module of the network-accessible services system, the instructions upon execution causing the message queue service to:

receive, from the request processing module in response to a detection that a preset maximum number of instances of the program code are concurrently executing in the network-accessible services system, a first event message associated with a first event designated to trigger execution of the program code;

obtain the first definition record;

compare the first definition record to the first event message to determine that the first event is associated with the first context value;

using the first context value, obtain the first queue identifier from the first context record;

store the first event message in a first queue of a plurality of queues stored in the memory, the first queue being associated with the first queue identifier and configured to store only event messages for events associated with the first context value;

receive, from the request processing module, a first request for one of one or more queued event messages;

randomly select, from the plurality of queues, a selected queue;

determine that the selected queue contains at least one of the one or more queued event messages;

obtain, as a first queued event message, the queued event message that is first in the selected queue; and deliver the first queued event message to the request processing module.

2. The system of claim 1, wherein the plurality of queues further includes a second queue associated with the second queue identifier and with a weight and configured to store only one or more event messages containing the second context value, the message queue service further including instructions that upon execution cause the message queue service to:

randomly select the selected queue from a list stored in the memory, the list listing each queue of the plurality of queues once, and further listing the second queue a first number of additional times, the first number selected based on the weight of the second queue; and when the second queue is the selected queue:

obtain, as a second queued event message, the queued event message that is next in the selected queue after the first queued event message; and deliver the second queued event message to the request processing module in response to a second request for one of the one or more queued messages, the second request consecutively following the first request.

3. The system of claim 1, wherein:

the electronic data store is further configured to store:

a second definition record comprising information for identifying a context value belonging to a second context type, the second context value belonging to the second context type; and a third context record comprising a third context value belonging to the second context type, the third context value being associated with the first queue identifier; and the message queue service further including instructions that upon execution cause the message queue service to:

determine that a current number of the queued event messages are contained in the plurality of queues;

determine that the current number exceeds a threshold number;

reconfigure the first queue to only store:

any of the one or more queued event messages stored in the first queue when the first queue is reconfigured; and event messages for events associated with the third context value.

4. The system of claim 1, further comprising a user interface module in communication with the message queue service and with a user device, wherein:

the user interface module is configured to:

send, to the user device, a user interface configured to display on the user device a prompt to enter one or more handling rules;

receive from the user device a plurality of user inputs entered into the user device in response to the prompt; and send the plurality of user inputs to the message queue service; and the message queue service is further configured to, prior to receiving the first event message:

receive the plurality of user inputs;

store a first user input of the plurality of user inputs in the electronic data store as the first definition record;

store a second user input of the plurality of user inputs in the electronic data store as the first context record; and store a third user input of the plurality of user inputs in the electronic data store as the second context record.

5. The system of claim 1, wherein each queue of the plurality of queues is associated with a corresponding context value of a plurality of context values including the first context value, such that each queue of the plurality of queues stores only received requests to execute the program code that are associated with the corresponding context value of the queue, each context value of the plurality of context values representing an attribute of a corresponding event of a plurality of events designated to trigger execution of the program code.

6. The system of claim 5, wherein each context value of the plurality of context values identifies a corresponding event provider of a plurality of event providers each creating one or more of the plurality of events, the message queue service selecting each of the plurality of queues as the selected queue with approximately equal frequency.

7. The system of claim 5, wherein the message queue service is further configured to, before receiving the first request:

receive a user input entered into a user device in response to a prompt, displayed on the user device, to enter one or more handling rules for queueing, in the plurality of queues, event messages associated with the plurality of events;

determine that the user input includes the plurality of context values; and associate each queue of the plurality of queues with the corresponding context value of the plurality of context values.

8. The system of claim 1, wherein the first queue is prioritized, with respect to each other queue of the plurality of queues, for selection as the selected queue using an associated weight, and to select the selected queue the message queue service is further configured to randomly select the selected queue from a list listing each queue of the plurality of queues once, and further listing the first queue a first number of additional times, the first number selected based on the weight of the first queue.

9. The system of claim 1, wherein the first queue is prioritized, with respect to each other queue of the plurality of queues, for selection as the selected queue using an associated weight, and the message queue service is further configured to, when the first queue is the selected queue:

determine that the selected queue contains a second queued request of the one or more queued requests; and responsive to a third request, from the network-accessible services system, for one of the one or more queued requests, the third request consecutively following the second request, deliver the second queued request to the network-accessible services system.

10. The system of claim 1, wherein to determine that the first request is associated with the first context value, the message queue service is configured to:

obtain a context definition comprising a context type and a format for identifying any of a plurality of context values belonging to the context type; and using the format, determine that data associated with the first request contains the first context value.

11. The system of claim 10, wherein the format comprises a text pattern including an indicator identifying a plurality of characters within the text pattern, and wherein to determine that data associated with the first request contains the first context value, the message queue service is configured to:

compare the format to the data to determine that the data includes text matching the text pattern; and identify a portion of the text that corresponds to the indicator as the first context value.

12. A method, comprising:

receiving, in response to a detection that a preset maximum number of instances of a program code of a user are concurrently executing in a network-accessible services system, a first event message describing a first event designated to trigger execution of the program code on the network-accessible services system;

obtaining a first definition record comprising information for identifying a context value belonging to a first context type;

comparing the first definition record to the first event message to determine that the first event is associated with a first context value belonging to the first context type;

obtaining, using the first context value, a first queue identifier from a first context record identifying a first queue identifier associated with the first context value;

placing the first event message in a first queue of a plurality of queues, the first queue configured to store only received event messages that describe events associated with the first context value;

receiving, from the network-accessible services system, a first request to provide one of one or more queued event messages;

selecting, at random from the plurality of queues, a selected queue;

determining that the selected queue contains at least one of the one or more queued event messages;

obtaining, as a first queued event message, the queued event message that is first in the selected queue; and delivering the first queued event message, of the one or more queued event messages, to the network-accessible services system.

13. The method of claim 12, further comprising:

receiving a user input entered into a user device in response to a prompt, displayed on the user device, to enter one or more handling rules for queueing, in the plurality of queues, event messages associated with one or more of a plurality of context values including the first context value;

determining that the user input includes the plurality of context values; and associating each queue of the plurality of queues with a corresponding context value of the plurality of context values such that the queue is configured to store only received event messages associated with the corresponding context value.

14. The method of claim 13, wherein selecting the selected queue comprises selecting the selected queue from a list listing each queue of the plurality of queues once, and further listing the first queue a first number of additional times, the first number selected based on a weight of the first queue.

15. The method of claim 13, further comprising:

determining that the selected queue contains a second queued event message of the one or more queued event messages; and responsive to a second request, from the network-accessible services system, for one of the one or more queued event messages, the second request consecutively following the first request, deliver the second queued event message to the network-accessible services system.

16. The method of claim 13, wherein the first context value is a first user identifier for a first user that created a first event in the network-accessible services system, the first event generating the first request, wherein the plurality of queues further includes a second queue associated with a second user identifier for a second user, and wherein selecting the selected queue comprises selecting the first queue or the second queue as the selected queue with approximately equal frequency.

17. The method of claim 12, wherein determining that the first event message is associated with the first context value comprises:

obtaining a context definition comprising a context type and a format for identifying any of a plurality of context values belonging to the context type; and using the format, determining that data associated with the first event message contains the first context value.

18. The method of claim 17, wherein the format comprises a text pattern including an indicator identifying a plurality of characters within the text pattern, and wherein determining that data associated with the first event message contains the first context value comprises:

compare the format to the data to determine that the data includes text matching the text pattern; and identifying a portion of the text that corresponds to the indicator as the first context value.

19. One or more non-transitory computer-readable media comprising executable instructions for processing requests to execute a program code on a network-accessible services system, wherein the instructions, when executed by a computing system, cause the computing system to:
- receive, from a request processing module in response to a detection that a preset maximum number of instances of the program code are concurrently executing in the network-accessible services system, a first event message associated with a first event designated to trigger execution of the program code;
- obtain a first definition record comprising information for identifying a context value belonging to a first context type;
- compare the first definition record to the first event message to determine that the first event is associated with a first context value belonging to the first context type;
- using the first context value, obtain a first queue identifier from a first context record identifying a first queue identifier associated with the first context value;
- store the first event message in a first queue of a plurality of queues, the first queue being associated with the first queue identifier and configured to store only event messages for events associated with the first context value;
- receive, from the request processing module, a first request for one of one or more queued event messages;
- randomly select, from the plurality of queues, a selected queue;
- determine that the selected queue contains at least one of the one or more queued event messages;
- obtain, as a first queued event message, the queued event message that is first in the selected queue; and
- deliver the first queued event message to the request processing module.

* * * * *